United States Patent
Tamura

(10) Patent No.: US 11,193,815 B2
(45) Date of Patent: Dec. 7, 2021

(54) ARTICLE INSPECTION APPARATUS

(71) Applicant: ANRITSU INFIVIS CO., LTD., Kanagawa (JP)

(72) Inventor: Junichi Tamura, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 126 days.

(21) Appl. No.: 16/710,552

(22) Filed: Dec. 11, 2019

(65) Prior Publication Data

US 2020/0191642 A1 Jun. 18, 2020

(30) Foreign Application Priority Data

Dec. 13, 2018 (JP) .............................. JP2018-233661

(51) Int. Cl.
*G01G 11/00* (2006.01)
*G01G 23/01* (2006.01)

(52) U.S. Cl.
CPC ........... *G01G 23/01* (2013.01); *G01G 11/003* (2013.01)

(58) Field of Classification Search
CPC ...... G01G 23/01; G01G 23/163; G01G 15/00; G01G 11/003; G01G 11/006
See application file for complete search history.

(56) References Cited

U.S. PATENT DOCUMENTS

| 3,850,023 | A | * | 11/1974 | McDonald | ........... | G01G 11/006 73/1.13 |
| 4,231,439 | A | * | 11/1980 | Hall, Jr | ................ | G01G 19/035 177/1 |
| 4,709,770 | A | * | 12/1987 | Kohashi | ............... | G01G 3/1414 177/185 |
| 5,300,736 | A | * | 4/1994 | Ehrhardt | ................ | G01G 15/00 177/1 |
| 5,308,930 | A | * | 5/1994 | Tokutu | ................. | G01G 11/046 177/119 |
| 5,635,679 | A | * | 6/1997 | Kohashi | ............... | G01G 19/035 177/1 |

FOREIGN PATENT DOCUMENTS

| JP | 2003-315286 A | 11/2003 |
| JP | 2006-322750 A | 11/2006 |
| JP | 2011-209177 A | 10/2011 |
| JP | 2012-173166 A | 9/2012 |
| JP | 2013-113784 A | 6/2013 |

* cited by examiner

*Primary Examiner* — Randy W Gibson
(74) *Attorney, Agent, or Firm* — Pearne & Gordon LLP

(57) ABSTRACT

An article inspection apparatus includes a measuring unit 11 that outputs a measuring signal of weight within a required measurement time from a weight application time, when the weight of an article W is applied, a determination unit 16 that inspects the article W based on the measuring signal, an electromagnetic coil 84 that applies a diagnostic load to the measuring unit 11, and a performance diagnosis unit 18 that causes the diagnostic load to be applied from the electromagnetic coil 84 to the measuring unit 11, within a predetermined diagnosable time longer than the required measurement time from the weight application time, when the weight of the article W is applied to the measuring unit 11, and diagnoses the performance of the measuring unit 11, based on the measuring signal when the diagnostic load is applied.

5 Claims, 7 Drawing Sheets

ARTICLE INSPECTION APPARATUS

TECHNICAL FIELD

The present invention relates to an article inspection apparatus, and more particularly to an article inspection apparatus having a measuring instrument capable of measuring the weight of an article.

BACKGROUND ART

As an article inspection apparatus for inspecting articles conveyed on production lines of food, medicine, or the like, an article inspection apparatus in which the weight of conveyed articles is applied as a load from the weighing platform to the measuring instrument in a conveyor with a weighing platform (hereinafter referred to as measuring conveyor) is frequently used.

In such an article inspection apparatus, the movement of movable parts such as a weighing platform and a conveyor may deteriorate or the sensitivity of the measuring instrument may deteriorate, so it is necessary to be able to diagnose timely whether or not an accurate measurement value is obtained. On the other hand, in such an article inspection apparatus, it is desirable that sensitivity for each product type can be set and timely sensitivity correction can be performed so as to keep the measurement value error within an allowable range without stopping the production line as much as possible.

Therefore, in the related art, a technique of switching an inspection mode between a normal inspection mode and an operation check mode based on the timing of article detection by a carry-in sensor (see, for example, Patent Document 1), and a technique in which by outputting a mode switching signal is output in response to a request operation, and discharging an inspection object in a confirmation discharge direction different from a normal conveyance direction, the inspection object for verification can be automatically taken out from the production line, and the measurement error can be corrected without stopping the production line (see, for example, Patent Document 2) have been known.

Further, a technique in which in an article inspection apparatus using X-rays, an operation is confirmed with a simulated deterioration image at the start of operation (see, for example, Patent Document 3) and a technique in which a test piece for sensitivity adjustment is disposed on the outer side in the width direction of a conveyance path through which an inspection object does not pass such that the foreign object detection function can be checked (see, for example, Patent Document 4) also have been known.

Further, in order to suppress measurement errors due to sudden external vibration input, or the like, load applying means capable of applying a load to the measuring instrument is provided, and a load to be normally applied by the load applying means is stored in a memory in advance, an abnormality in inspection performance can be automatically detected by comparing a load applied at diagnostic time by the load applying means which is measured at the time of a periodic diagnosis with the load to be normally applied (see, for example, Patent Document 5).

RELATED ART DOCUMENT

[Patent Document]
[Patent Document 1] JP-A-2013-113784
[Patent Document 2] JP-A-2006-322750
[Patent Document 3] JP-A-2011-209177
[Patent Document 4] JP-A-2003-315286
[Patent Document 5] JP-A-2012-173166

DISCLOSURE OF THE INVENTION

Problem that the Invention is to Solve

However, in the article inspection apparatuses in the related art as described above, since the diagnosis of the measurement value is periodically performed, the measurement sensitivity cannot be diagnosed for each measurement operation of the article, and even if an abnormality occurs in the sensitivity of the measuring instrument after one operation check, it is not possible to find a device failure due to the sensitivity abnormality until the next operation check.

Further, as in the past, since the worker flows the master work of the inspection object, for example, the master work of a non-defective product (OK product) and a defective product (NG product) to the production line at predetermined time intervals, even in a case where an operation check is performed to diagnose whether or not the inspection performance is normal, when an abnormality occurs in the sensitivity of the measuring instrument after one operation check, a device failure due to the sensitivity abnormality may not be found until the next operation check.

Therefore, every time a device failure due to an abnormality in sensitivity is found in the operation check, it is necessary to search for whether or not there is an outflow of the defective product (including non-defective articles with incorrect distribution destination and classification) or to collect defective products by re-inspection, for inspected products within a certain time until the operation check, so there is a problem in that productivity is reduced.

The present invention has been made to solve such problems, and an object of the present invention is to provide an article inspection apparatus capable of greatly reducing the burden on the worker required to prevent the outflow of defective products when the apparatus is defective, and effectively preventing a decrease in productivity.

Means for Solving the Problem

In order to achieve the above object, an article inspection apparatus according to the present invention includes a measuring instrument that outputs, when weight of an article is applied, a measuring signal of the weight within a required measurement time from an weight application time, a determination unit that inspects the article based on the measuring signal, a load applying unit that applies a diagnostic load to the measuring instrument; and a diagnosis unit that causes the diagnostic load to be applied from the load applying unit to the measuring instrument, within a predetermined diagnosable time longer than the required measurement time from the weight application time, when the weight of the article is applied to the measuring instrument, and diagnoses performance of the measuring instrument, based on the measuring signal when the diagnostic load is applied.

With this configuration, the performance of the measuring instrument can be diagnosed based on the measuring signal of the diagnostic load within a predetermined diagnosable time under a state where the weight of the article is applied to the measuring instrument, and the performance of the article inspection apparatus can be diagnosed for each measurement of each article. Therefore, when an apparatus failure related to the measurement performance occurs, an abnormality due to the occurrence of the defect can be detected immediately, and the work that has been a burden for preventing the outflow of defective products when the device failure occurs becomes unnecessary.

In the present invention, the diagnosis unit can be configured to apply the diagnostic load from the load applying unit to the measuring instrument on the condition that the required measurement time has elapsed from the weight application time within the diagnosable time. In this case, the diagnostic load is applied after the load applying due to the weight of the article is stabilized, and an accurate diagnosis of the measurement performance can be performed every time the weight of the article is measured.

In the present invention, the load applying unit may be configured to include application setting means for setting a load to be applied to the measuring instrument, application timing setting means for setting an application timing of the load to be applied, and application control means for controlling the value of the load to be applied. With this configuration, according to a required performance, the setting of the suitable sensitivity with respect to a measurement object load, or the like becomes possible.

In the present invention, the diagnosis unit is configured to include weight value calculation means for calculating a weight value of the article based on a measuring signal of the article weight within the required measurement time, applied-load-value calculation means for calculating a value of diagnostic load based on the measuring signal within the diagnosable time, and sensitivity determination means for determining the sensitivity of the measuring instrument based on the value of diagnostic load. In this case, suitable measurement sensitivity is ensured.

In the present invention, the applied-load-value calculation means calculates the value of the diagnostic load by subtracting the weight value of the article calculated based on the measuring signal within the required measurement time from the load value calculated based on the measuring signal after the required measurement time within the diagnosable time, in a state where the weight of the article is applied to the measuring instrument within the diagnosable time. In this case, by removing the influence of the weight value of the article W measured immediately before, it becomes possible to stably calculate the value of the diagnostic load for each measurement, and it is possible to accurately determine the change in sensitivity.

In addition, in a case where the measuring instrument normally has a component that can be a load applying unit, such as an electromagnetic balance type scale, the component can be used as a load applying unit, and in a case of a different type scale, a load applying unit equipped with others than electromagnetic can be added.

Advantage of the Invention

According to the present invention, it is possible to provide an article inspection apparatus capable of greatly reducing the burden on the worker required to prevent the outflow of defective products when the apparatus is defective, and effectively preventing a decrease in productivity.

BEST MODE FOR CARRYING OUT THE INVENTION

Hereinafter, an embodiment of the present invention will be described with reference to the drawings.

FIGS. 1 to 4 show an article inspection apparatus according to an embodiment of the present invention. In the present embodiment, the present invention is applied to an article inspection apparatus having a measuring instrument capable of measuring the weight of an article.

First, the configuration will be described.

Figure 1:
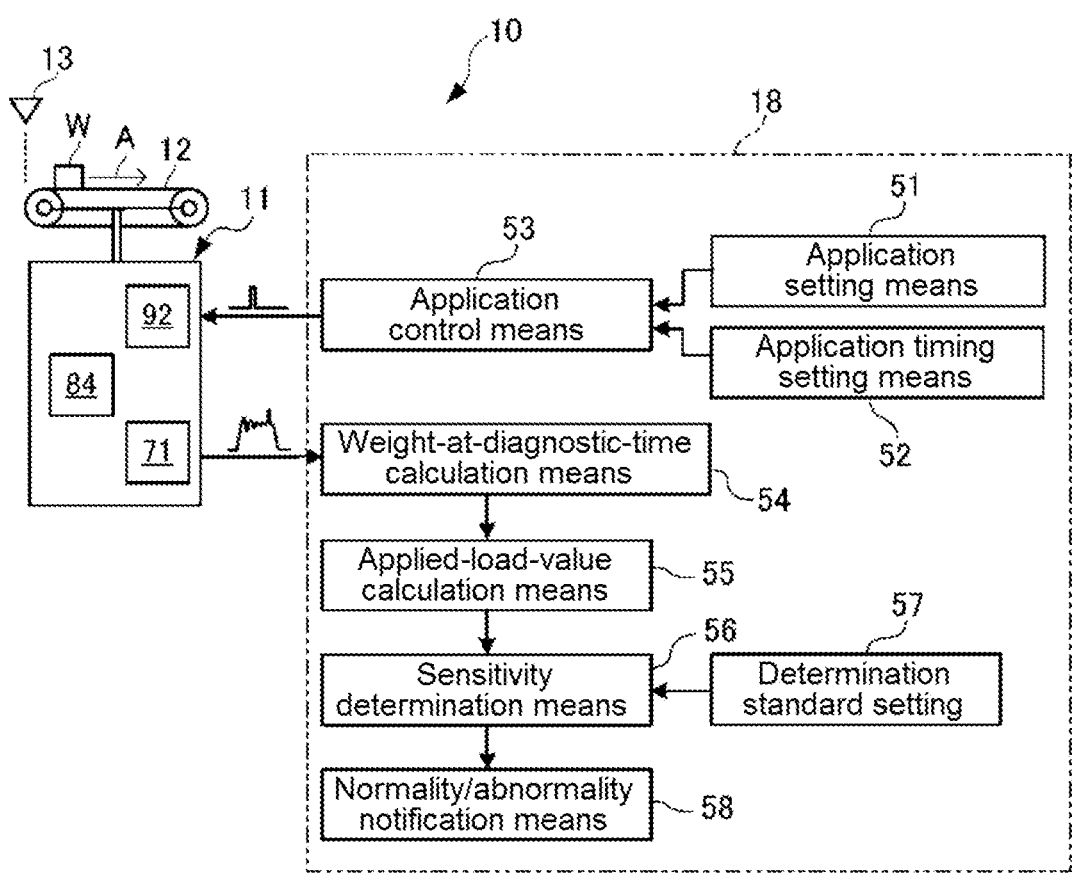
FIG. 1 is a schematic block configuration diagram of a diagnostic system in an article inspection apparatus according to an embodiment of the present invention.
Figure 2:
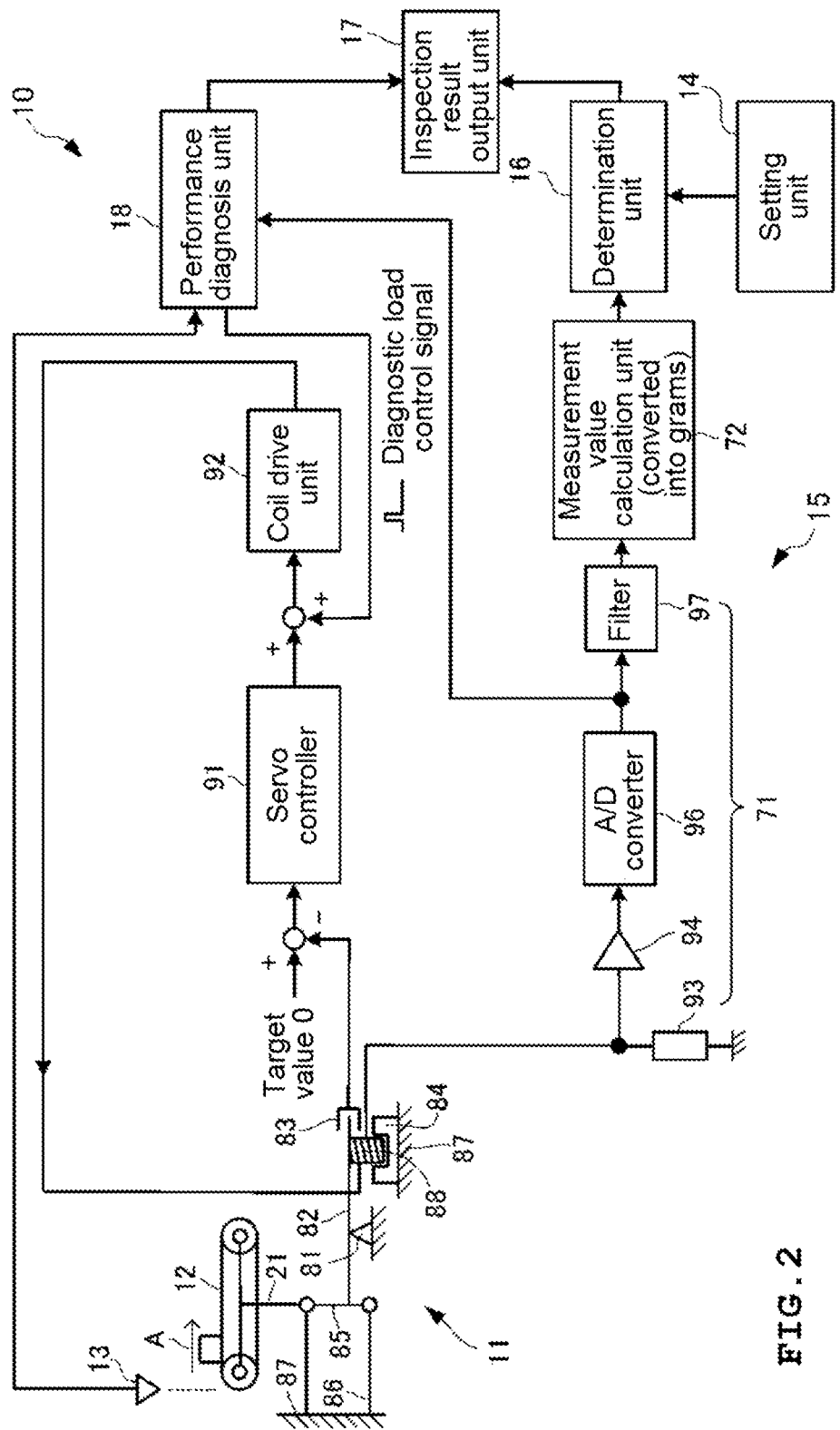
FIG. 2 is a schematic block configuration diagram of a weighing system in the article inspection apparatus according to the embodiment of the present invention.

As shown in FIGS. 1 and 2, the article inspection apparatus 10 according to the present embodiment includes a measuring unit 11, a conveyance unit 12, a carry-in sensor 13, a setting unit 14, a measuring control unit 15, a determination unit 16, an inspection result output unit 17, and a performance diagnosis unit 18. Further, a running conveyor (not shown) is provided in the front stage of the article inspection apparatus 10, and a sorting machine (not shown) is provided in the rear stage.

The measuring unit 11 and the conveyance unit 12 are integrally disposed in a part of a production line for meat, fish, processed food, pharmaceuticals, and other articles W (articles to be measured, articles to be inspected), and the weight of each article W carried into the conveyance unit 12 in the direction of an arrow A in FIG. 2 is measured by the measuring unit 11.

The measuring control unit 15 controls the operations of the measuring unit 11 and the conveyance unit 12, and the determination unit 16 compares the measured value of the weight of the article W with the reference value set in advance by the setting unit 14 or its upper and lower limit values, and executes determination as to whether the measured value is within the allowable range, the weight rank determination, and the like.

The result of the quality determination by the measuring unit 11 and the result of the weight rank determination are displayed, for example, on a screen by the inspection result output unit 17, and also output to a sorting machine connected to the rear stage of the article inspection apparatus 10. In the sorting machine, the articles W are distributed to the corresponding conveyance directions according to the quality determination result and the weight rank determination result which are output by the article inspection apparatus 10.

The performance diagnosis unit 18 is a diagnosis unit that diagnoses whether there is an abnormality in the measurement performance every time the measuring signal of each article W is output and the weight is measured, based on the measuring signal (weighing signal) corresponding to the weight of the article W obtained by the measuring unit 11 (this will be described later).

Specifically, the measuring unit 11 is a load sensor that outputs a measuring signal corresponding to the load of the article W while supporting the conveyance unit 12 that is a measuring conveyor with the weighing platform 21, and for example, it is a measuring instrument composed of an electromagnetic balance type scale. When the weight of the article W is applied, the measuring unit 11 can output a measuring signal of the weight within a required measurement time from the weight application time.

More specifically, as shown in FIG. 2, the measuring unit 11 includes a suspension plate 85 that displaces up and down (vertically) together with the weighing platform 21 of the conveyance unit 12, a parallel spring 86 that suspends the suspension plate 85, a cage 82 having one end 82 fixed to the suspension plate 85, a fulcrum 81 that supports the cage 82, a position sensor 83 that detects the position of the other end of the cage 82, an electromagnetic coil 84 with a magnet 88 that applies force to the other end of the cage 82, a coil drive unit 92 that drives the electromagnetic coil 84, and a servo controller 91 that controls the coil drive unit 92 by servo control such as PID control based on a detection signal from the position sensor 83. Note that one end of the parallel spring 86 is fixed to the suspension plate 85, and the other end is fixed to a common base 87 with the fulcrum 81 and the electromagnetic coil 84, thereby forming a so-called Robert mechanism.

In the electromagnetic balance type scale as the measuring unit 11, the balance of the cage 82 is maintained by the servo controller 91 when there is no load, and when the article W is placed on the conveyance unit 12 with the weighing platform and the cage 82 is inclined, the inclination is detected by the position sensor 83, and a current flows through the electromagnetic coil 84 by the servo controller 91 such that the deviation between the detected value and the target value (usually zero inclination) is zero. Since this current is proportional to the weight of the article W, it can be converted into a weight value in grams.

The conveyance unit 12 includes a weighing platform 21 and a conveyance drive motor (not shown). An article W carried in in the direction of an arrow A from an upstream side conveyor such as a running conveyor is carried under a predetermined carrying condition enabling weight measurement by the measuring unit 11. Although not shown in detail, the conveyance unit 12 includes a belt conveyor having, for example, a drive roller as the conveyance drive side, a driven roller spaced apart in parallel to the drive roller, and an endless conveyor belt wound between the two rollers, and both rollers are supported by the weighing platform 21.

The carry-in sensor 13 is, for example, a photoelectric sensor having a light projecting/receiving unit, and is disposed between the running conveyor and the conveyance unit 12. The carry-in sensor 13 detects the carry-in of the article W when the received light is blocked by the article W passing between the light projecting unit and the light receiving unit, and the detection signal is input to the measuring control unit 15.

The setting unit 14 has an input interface through which input the conveyance conditions, inspection conditions, inspection result determination conditions, and the like for each type of the article W can be set and input or can be received by data communication input, and a storage device that stores setting information.

The measuring control unit 15 includes a signal processing means 71 and a measurement value calculation unit 72 so as to execute measurement processing in the measuring unit 11 and conveyance speed control by the conveyance unit 12.

The signal processing means 71 executes signal processing according to predetermined signal processing conditions based on the measuring signal from the measuring unit 11, and outputs a processed signal capable of calculating the measurement value. For example, the signal processing means 71 passes only the low-frequency component of the measuring signal as a processed signal, with respect to the measuring signal from the measuring unit 11, by using a filter selected according to the type of the article W from a plurality of low-pass filters of different types and characteristics.

Specifically, as shown in FIG. 2, the signal processing means 71 includes a current detection resistor 93 connected in series to the electromagnetic coil 84 to detect the current flowing through the electromagnetic coil 84 of the measuring unit 11, an amplifier 94 that amplifies the detection signal of the current flowing through the electromagnetic coil 84, an A/D converter 96 that digitally converts the filtered signal, and a filter 97 that filters the digitally converted signal.

As the filter in the signal processing means 71, a finite impulse response (FIR) filter or an infinite impulse response (IIR) filter can be used. The FIR filter here is a finite impulse response filter which outputs an output for a fixed time (finite time) when an impulse response waveform is input, and the IIR filter is an infinite impulse response filter which outputs an attenuation waveform of the impulse response waveform infinitely.

The FIR filter constitutes a low-pass filter that passes a predetermined low-frequency component for the measuring signal converted into a digital signal by the A/D converter, and performs a weighted averaging process using a simple averaging process or a known window function. The IIR filter may constitute an analog filter that directly receives a measuring signal (analog measuring signal) from the measuring unit 11 and outputs a processed signal to the A/D converter using hardware whose characteristics can be changed, such as a switched capacitor filter, or a digital filter that receives a digital measuring signal (not shown) from the A/D converter.

The measurement value calculation unit 72 calculates the measurement value of the article W as a gram-converted value, based on the processed signal from the signal processing means 71. Further, when a predetermined reference time Tk (see FIG. 3) has elapsed since the start of the carry-in of the article W onto the conveyance unit 12 is detected by the carry-in sensor 13, the measurement value calculation unit 72 calculates the measurement value for the article W of which the measuring signal is output from the measuring unit 11.

The weight value of each article W calculated by the measurement value calculation unit 72 is stored as calculation data in a storage means (not shown).

Figure 3:
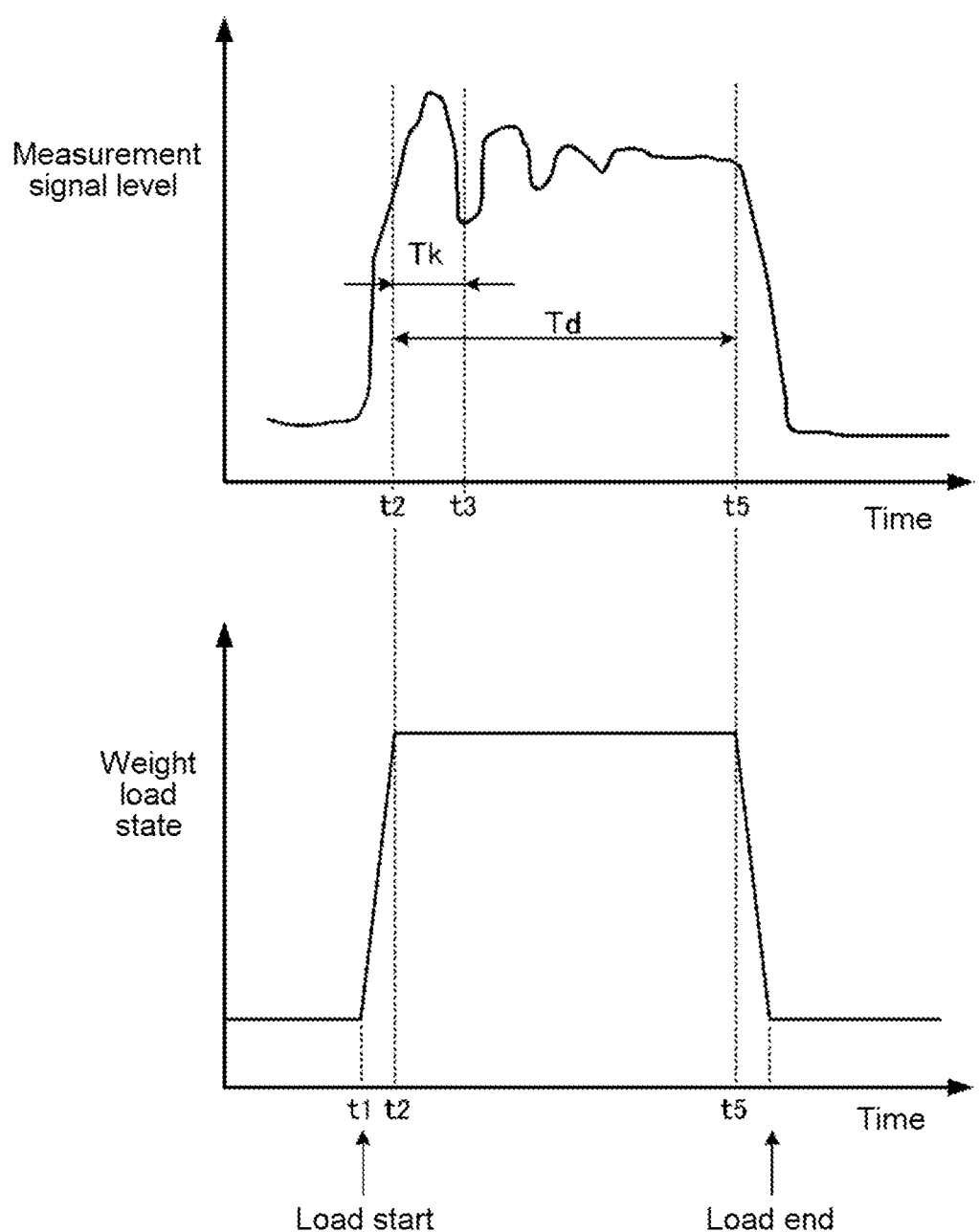
FIG. 3 is an explanatory diagram of a measuring signal and a measurable period based on the measuring signal in the article inspection apparatus according to the embodiment of the present invention.

The above-described predetermined reference time Tk is the time from the time t1 when the carry-in sensor 13 detects the start of the carry-in of the article W into the conveyance unit 12 (carry-in start time, weight application start time), the article W is completely transferred to the conveyance unit 12, as shown in FIG. 3, until the time t2 when the total weight of the article W is applied to the measuring unit 11 (hereinafter referred to as the weight application time), and for example, it can be detected as the time required from the leading end detection to the rear end detection of the article W by the carry-in sensor 13.

Specifically, the predetermined reference time Tk is set based on the conveyance speed (m/min) of the conveyance unit 12 that is a measuring conveyor, the length (mm) in the conveyance direction (arrow A direction) of the conveyance unit 12, the length (mm) in the arrow A direction which is the conveyance direction of the article W, the size of the article W, the processing capacity of the line, and other conditions. Further, when the predetermined reference time Tk has elapsed since the leading end of the article W is detected by the carry-in sensor 13, the article W moves by a predetermined distance from the carry-in start detection position and reaches the mass measurement position, and measurement is performed.

In the measurement value calculation unit 72, parameters as inspection conditions such as the measurement range, measurement capability, and inspection accuracy are selected according to the type (particularly size) of the article W. When the measurement range is selected from 6 g to 600 g and the measurement capability is selected at a maximum of 150 pieces/min, for example, depending on the type of W, the reference time Tk per article W may be 400 msec or more, but the closer to 400 msec, the shorter the measurement time, the higher the inspection efficiency, and the longer from 400 msec, the longer the inspection time, but the measurement accuracy increases because the conveyance on the conveyance unit 12 is stably performed.

The above-described memory device of the setting unit 14 stores condition parameters including a predetermined conveyance condition of the article W by the conveyance unit 12 and a predetermined signal processing condition in the signal processing means 71 in association with the type of the article W. Corresponding to each type number assigned to each type of article W, a conveyance speed, a filter characteristic, a non-defective range for determining the quality of the article W, and the like are stored.

The determination unit 16 stores a result determination program for comparing the measurement value calculated by the measurement value calculation unit 72 with the quality determination criteria stored in the setting unit 14 and determining the quality of the inspection result of the weighted article W.

The inspection result output unit 17 is a display device such as a flat panel display, and is configured to include display means capable of displaying on a screen, the operation state, the measurement value of the article W, the quality determination result, and the like during the operation of the article inspection apparatus 10, and executing, for each measurement process for measuring the weight of the article W, display capable of determining whether there is an abnormality in the measurement performance by a display color, for example. The display means here may be a touch panel in which displayed numbers, characters, and the like are input by a touch operation, or may be integrated with the setting unit 14.

The performance diagnosis unit 18 has a diagnostic program for determining whether there is an abnormality in the measuring (weighing) signal from the measuring unit 11, based on a predetermined diagnostic criteria (determination standards to be described later), for each signal processing and measurement value calculation processing in the measuring control unit 15 which measures the weight of each article W, and has a computer configuration necessary for executing the program.

Specifically, the performance diagnosis unit 18 can cause the coil drive unit 92 to excite and drive the electromagnetic coil 84 by applying a control signal pulse for applying a diagnostic load to the electromagnetic coil 84 of the measuring unit 11 to the control signal from the servo controller 91. The electromagnetic coil 84 of the measuring unit 11 can also function as a load applying unit that applies the diagnostic load corresponding to the pulse for applied load from the performance diagnosis unit 18 to the measuring unit 11.

As shown in FIGS. 3 and 4, when the weight of the article W is applied to the measuring unit 11, the performance diagnosis unit 18 causes a diagnostic load to be applied by the electromagnetic coil 84 within a predetermined diagnosable time Td (=predetermined reference time+actual measurement time Ta+diagnostic time Tb) longer than the required measurement time Tc required for obtaining a measuring signal sufficient for weight measurement (=predetermined reference time+actual measurement time Ta) from the weight application time t2 so as to diagnose the measurement performance of the measuring unit 11, based on the measuring signal of the weight of the article W and the measuring signal of the diagnostic load.

Figure 4A:
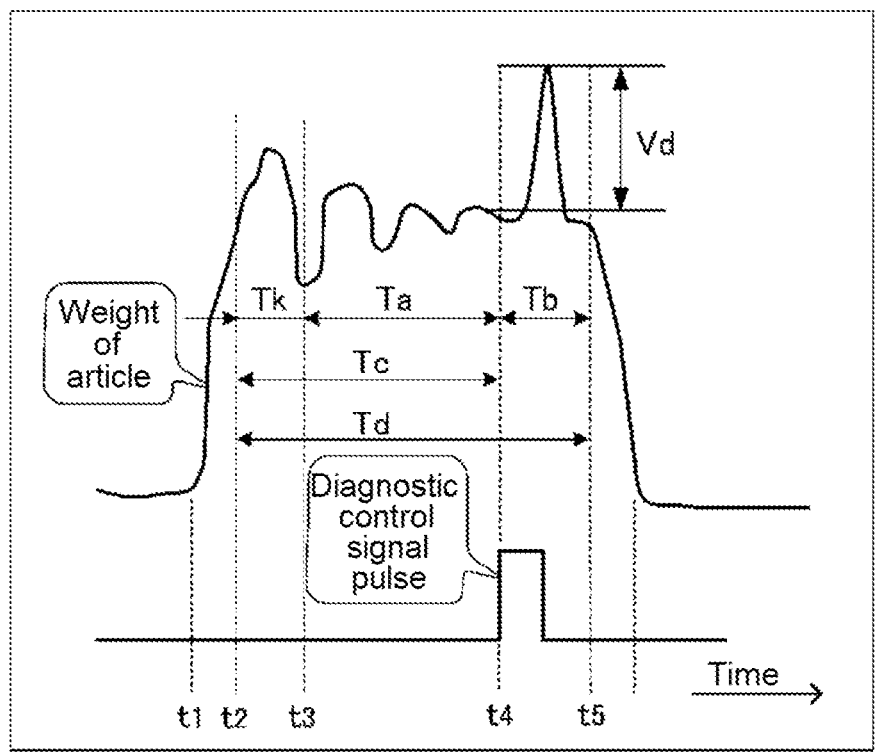
FIGS. 4A and 4B are an explanatory diagram of a measuring signal and an application timing of a measurement and diagnostic load based on the measuring signal in the article inspection apparatus according to the embodiment of the present invention.

More specifically, as shown in FIG. 4A, every time the article W is carried onto the conveyance unit 12, the performance diagnosis unit 18 outputs a diagnostic control signal pulse for applying a diagnostic load to the measuring unit 11 from the electromagnetic coil 84, within a predetermined diagnosable time Td from the weight application time t2 of the weight, on the condition that the required measurement time Tc has elapsed from the weight application time t2.

Further, the performance diagnosis unit 18 is configured to include application setting means 51 for setting the load to be applied from the electromagnetic coil 84 to the measuring unit 11, application timing setting means 52 for setting the application timing of the load to be applied, for example, based on the weight application time t2 of the weight described above, and application control means 53 for controlling the value of the load to be applied in cooperation with the electromagnetic coil 84 and the coil drive unit 92 based on the above-described diagnostic control signal pulse (signal level Vp×time Tp).

Further, the performance diagnosis unit 18 includes the weight-at-diagnostic-time calculation means 54 (weight value calculation means), the applied-load-value calculation means 55, the sensitivity determination means 56, the determination standard setting means 57, and the normality/abnormality notification means 58, which are shown in FIG. 1, as a plurality of function units realized by a predetermined control program.

As shown in FIG. 4A, when a required measurement time Tc has elapsed from the weight application time t2 and a diagnosis control signal pulse for applying a diagnostic load is output from the electromagnetic coil 84 to the measuring unit 11, the weight-at-diagnostic-time calculation means 54 calculates a load value including the weight of the article W and an applied-diagnostic-load from the electromagnetic coil 84, based on a measuring (weighing) signal from the signal processing means 71 of the measuring unit 11. That is, the weight-at-diagnostic-time calculation means 54 has a function of the weight value calculation means for calculating the weight value of the article W based on the measuring signal of the weight of the article W within the required measurement time Tc together with the measurement value calculation unit 72.

Figure 4B:
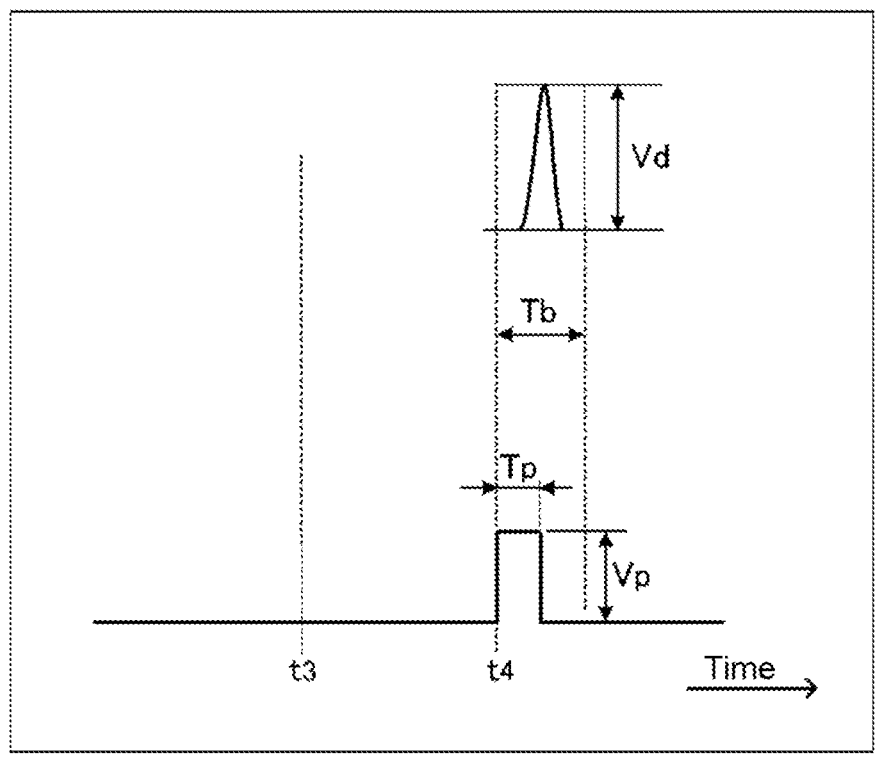

As shown in FIG. 4B, the applied-load-value calculation means 55 can calculate the applied-diagnostic-load value Vd by subtracting the calculated value of the weight of the article W calculated in the measurement value calculation unit 72 from the calculated value of the weight-at-diagnostic-time calculation means 54 based on the measuring signal of the load in the measuring unit 11, in a state where the weight of the article W is applied to the measuring unit 11 within the diagnosable time Td.

The sensitivity determination means 56 determines the detection sensitivity by comparing the calculated value of the applied-diagnostic-load value Vd with a preset determination standard value.

The determination standard setting means 57 sets and stores the reference value of the load corresponding to the diagnostic control signal pulse as the above-described determination standard value.

The normality/abnormality notification means 58 outputs the determination result of the sensitivity determination means 56, for example, the determination result of normal or abnormal, to the inspection result output unit 17 in a predetermined output format including the display of the result.

Next, the operation will be described.

In the article inspection apparatus 10 of the present embodiment configured as described above, the servo controller 91 of the measuring unit 11 maintains the balance of the cage 82 when there is no load, and when the weight of the article W is applied to the conveyance unit 12 which is the measuring conveyor, the inclination of the cage 82 is detected by the position sensor 83, and the electromagnetic coil 84 is excited and driven by the servo controller 91 such that the deviation between the detected value and the target value is zero. At that time, a measuring signal is output from the signal processing means 71 in accordance with the change in the excitation current of the electromagnetic coil 84 corresponding to the weight load of the article W, and the weight value is calculated by the measurement value calculation unit 72 after being converted into grams.

On the other hand, in a state where the weight of the article W is applied to the measuring unit 11 for such weight measurement, a measuring signal of the load obtained by adding a diagnostic load to the article weight is input to the performance diagnosis unit 18 as the measuring signal of the load from the signal processing means 71, within a predetermined diagnosable time Td from the load applying time t2, and the performance diagnosis of the measuring unit 11 is executed based on the applied-diagnostic-load value Vd. Therefore, an accurate performance diagnosis of the article inspection apparatus 10 can be performed for each measurement of each article W.

a result, when a device failure related to the measurement performance occurs in the article inspection apparatus 10, an abnormality due to the occurrence of the failure can be detected immediately, so the outflow of defective products to the outside of the line when the device failure occurs can be reliably prevented, and the burdensome work such as re-inspection work to prevent the outflow is unnecessary.

Moreover, in the present embodiment, a diagnostic load is applied from the electromagnetic coil 84 to the measuring unit 11 within the diagnosable time Td and on condition that the required measurement time Tc has elapsed from the weight application time t2 of the diagnostic load, so a diagnostic load is applied after the load applied by the article weight is stabilized, and an accurate diagnosis of the measurement performance can be performed for each measurement of the article weight.

Further, in the present embodiment, the performance diagnosis unit 18 is configured to include application setting means 51 for setting a load to be applied to the measuring unit 11, as the load applying unit, application timing setting means 52 for setting an application timing of the applied load, and application control means 53 for controlling the applied load value, so it is possible to set an appropriate sensitivity for the load to be measured, according to the required performance.

Further, in the present embodiment, the performance diagnosis unit 18 is configured to include a weight-at-diagnostic-time calculation means 54 that calculates the weight value of the article based on the measuring signal of the article weight within the required measurement time Tc, an applied-load-value calculation means 55 for calculating the applied-diagnostic-load value based on the measuring signal within the diagnosable time Td, and a sensitivity determination means 56 for determining the sensitivity of the measuring unit 11 based on the applied-diagnostic-load value, so suitable measurement sensitivity can be ensured.

In addition, in the present embodiment, the applied-load-value calculation means 55 can calculate the applied-diagnostic-load value Vd by subtracting the weight value of the article W calculated based on the measuring signal within the required measurement time Tc from the load value calculated based on the measuring signal after the required measurement time Tc within the diagnosable time Td, in a state where the weight of the article W is applied to the measuring unit 11 within the diagnosable time Td. Therefore, by removing the influence of the weight value of the article W measured immediately before, it becomes possible to stably calculate the value Vd of the diagnostic load for each measurement, and it is possible to accurately determine the change in measurement sensitivity.

As described above, in the present embodiment, it is possible to provide an article inspection apparatus capable of greatly reducing the burden on the worker required to prevent the outflow of defective products when the apparatus is defective, and effectively preventing a decrease in productivity.

Figure 5A:
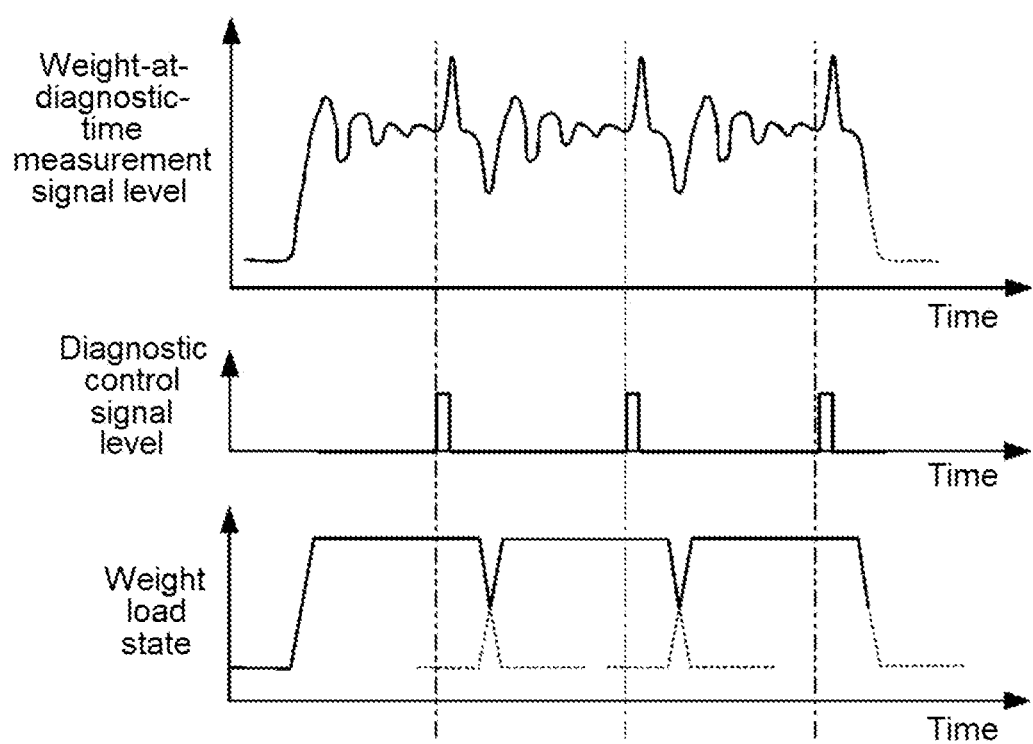
FIGS. 5A and 5B are an explanatory diagram of an application timing of a measurement and diagnostic load based on a difference in an article conveyance interval and a corresponding measuring signal in the article inspection apparatus according to an embodiment of the present invention.

In the above-described embodiment, a diagnostic load is applied by the electromagnetic coil 84 within a predetermined diagnosable time Td that is longer than the required measurement time Tc from the weight application time t2 based on the application time t2 of the total weight of the article W on the conveyance unit 12 that is a measuring conveyor. However, when the conveyance pitch of the article W is small as shown in FIG. 5A, as long as the loading period of the total weight of article W does not overlap, the time interval of the weight load of the plurality of articles W adjacent to each other in front and back may be narrowed, the timing for starting to carry in the subsequent article W onto the conveyance unit 12 is prior to complete removal of the weight of the preceding article W from the conveyance unit 12.

Figure 5B:
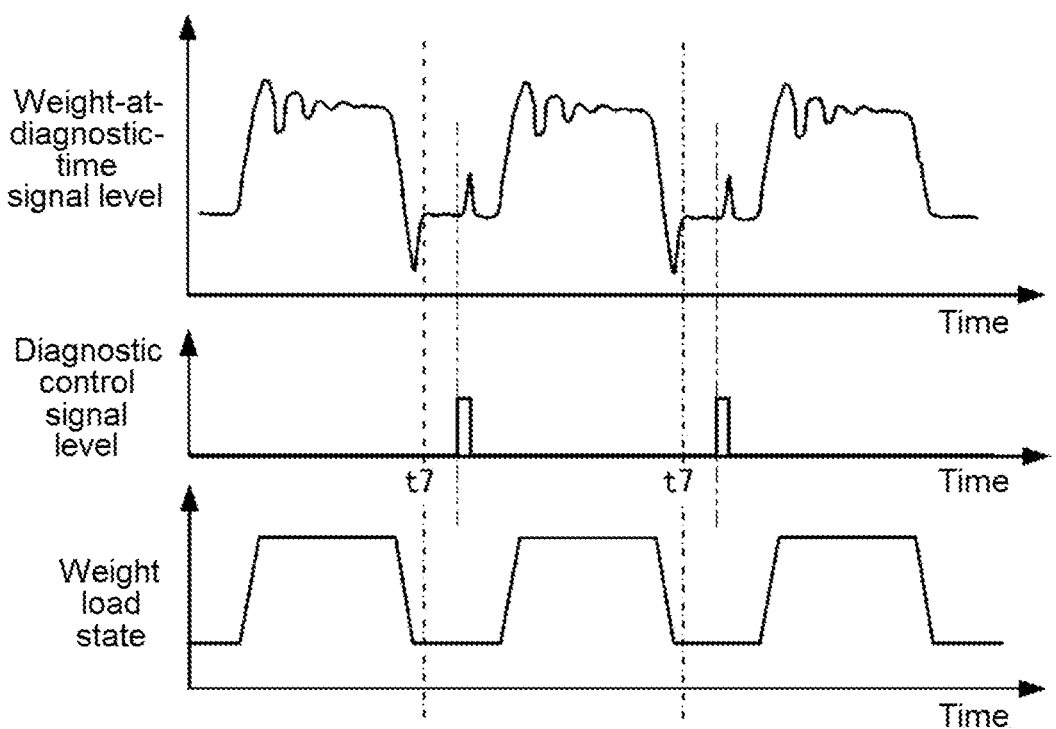

Further, as shown in FIG. 5B, when the conveyance pitch of the articles W is large and the time interval of the weight load of the plurality of articles W adjacent to each other is wide, the carry-in timing of the succeeding article W into the conveyance unit 12 is the time after the complete removal of the weight of the preceding article W from the conveyance unit 12. In that case, the diagnostic load may be applied immediately after the zero point correction with reference to the time t7 when the zero point correction load is applied from the electromagnetic coil 84 after the convergence time, as the weight application time t2 above-described, of the undershoot caused by removal of weight load of the article W.

Further, in the above-described embodiment, the measuring unit 11 is configured by an electromagnetic balance type scale having components as a load applying unit. However, the measuring instrument according to the present invention is not limited to those in which some of the components can be used as the load applying unit, like an electromagnetic balance type scale, but needless to say, even in the case of other types of scales, it may have a load applying unit equipped with an electromagnet and others that can be loaded on the weighing platform.

As described above, the article inspection apparatus according to the present invention can greatly reduce the burden on the worker required to prevent the outflow of defective products when the apparatus is defective, and can effectively prevent a decrease in productivity. The present invention is useful for general article inspection apparatuses having a measuring instrument capable of measuring the weight of an article.

DESCRIPTION OF REFERENCE NUMERALS AND SIGNS 10 article inspection apparatus
11 measuring unit (measuring instrument)
12 conveyance unit (measuring conveyor)
13 carry-in sensor
14 setting unit
15 measuring control unit (inspection control unit)
16 determination unit
17 inspection result output unit
18 performance diagnosis unit (diagnosis unit)
21 weighing platform
51 application setting means
52 application timing setting means
53 application control means
54 weight-at-diagnostic-time calculation means (weight value calculation means)
55 applied-load-value calculation means
56 sensitivity determination means
57 determination standard setting means
58 normality/abnormality notification means
71 signal processing means
72 measurement value calculation unit
81 fulcrum
83 position sensor
84 electromagnetic coil (load applying unit)
85 suspension plate
86 parallel spring
87 common base
88 magnets
91 servo controller
92 coil drive unit
93 current detection resistor
94 amplifier
96 A/D converter
97 filter
t1 time (carry-in start time, weight application start time)
t2 time (load applying time, application time of total weight)
Tc required measurement time
Td predetermined diagnosable time
Tk predetermined reference time

What is claimed is:

1. An article inspection apparatus comprising:
a measuring instrument that outputs, when weight of an article is applied, a measuring signal of the weight within a required measurement time from an weight application time;
a determination unit that inspects the article based on the measuring signal;
a load applying unit that applies a diagnostic pulse load to the measuring instrument; and
a diagnosis unit that causes the diagnostic pulse load to be applied from the load applying unit to the measuring instrument, within a predetermined diagnosable time longer than the required measurement time from the weight application time, when the weight of the article is applied to the measuring instrument, and diagnoses performance of the measuring instrument, based on the measuring signal when the diagnostic pulse load is applied.

2. The article inspection apparatus according to claim 1, wherein the diagnosis unit causes the diagnostic pulse load to be applied from the load applying unit to the measuring instrument on a condition that the required measurement time has elapsed from the weight application time, within the diagnosable time.

3. The article inspection apparatus according to claim 1, wherein the load applying unit is configured to include application setting means for setting a load to be applied to the measuring instrument, application timing setting means for setting an application timing of the load to be applied, and application control means for controlling a value of the load to be applied.

4. The article inspection apparatus according to claim 1, wherein the diagnosis unit is configured to include weight value calculation means for calculating a value of the weight of the article based on the measuring signal of the weight of the article within the required measurement time, applied-load-value calculation means for calculating a value of the diagnostic pulse load based on the measuring signal within the diagnosable time, and sensitivity determination means for determining sensitivity of the measuring instrument based on the value of the diagnostic pulse load.

5. The article inspection apparatus according to claim 4, wherein the applied-load-value calculation means calculates the value of the diagnostic pulse load by subtracting the weight value of the article calculated based on the measuring signal within the required measurement time from the load value calculated based on the measuring signal after the required measurement time within the diagnosable time, in a state where the weight of the article is applied to the measuring instrument, within the diagnosable time.

* * * * *